S. W. NICHOLSON.
COUNTER BALANCE ARM AND SPRING.
APPLICATION FILED JULY 9, 1921.

1,401,355.

Patented Dec. 27, 1921.
2 SHEETS—SHEET 1.

Inventor
Stanley W. Nicholson

By [Attorneys signatures]
Attorneys

S. W. NICHOLSON.
COUNTER BALANCE ARM AND SPRING.
APPLICATION FILED JULY 9, 1921.
1,401,355.
Patented Dec. 27, 1921.
2 SHEETS—SHEET 2.
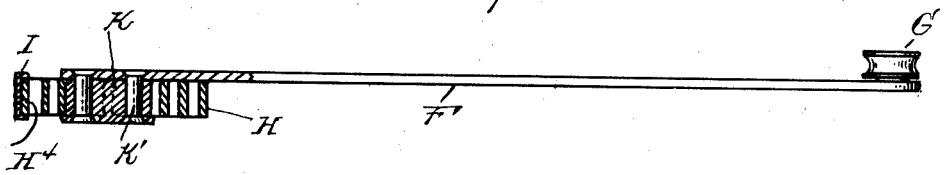
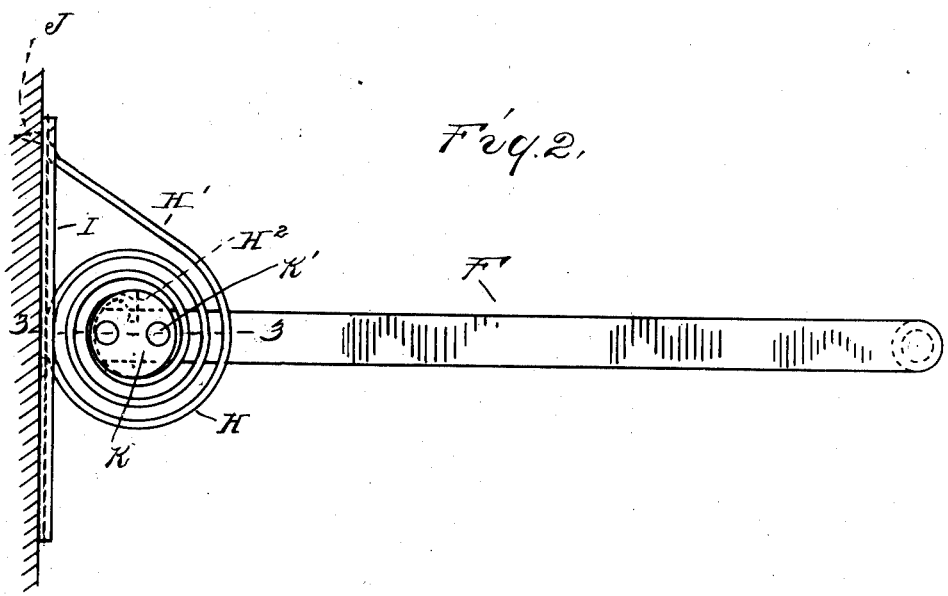

UNITED STATES PATENT OFFICE.

STANLEY W. NICHOLSON, OF TOLEDO, OHIO, ASSIGNOR TO DURA MECHANICAL HARDWARE COMPANY, OF TOLEDO, OHIO, A CORPORATION OF DELAWARE.

COUNTERBALANCE-ARM AND SPRING.

1,401,355.   Specification of Letters Patent.   Patented Dec. 27, 1921.

Application filed July 9, 1921. Serial No. 483,642.

*To all whom it may concern:*

Be it known that I, STANLEY W. NICHOLSON, a citizen of the United States of America, residing at Toledo, in the county of Lucas and State of Ohio, have invented certain new and useful Improvements in Counterbalance-Arms and Springs, of which the following is a specification, reference being had therein to the accompanying drawings.

This invention relates to the vertically slidable windows of vehicles, and particularly relates to a counterbalance arm for such a window and an associated spring.

It is the object of the invention to associate with the sliding window, a pivotal counterbalance arm and a coiled spring stressing said arm, said spring providing a floating mounting for the arm.

The advantages more especially sought by the invention are an increased simplicity in construction and assembly, an increased flexibility in the mounting of the arm, and self-alinement between the arm and engaged sliding window member.

In the drawings:

Fig. 2 is an enlarged view of the counterbalance means;

Fig. 3 is a plan view of the same partially in section on line 3—3 of Fig. 2.

Figure 1:
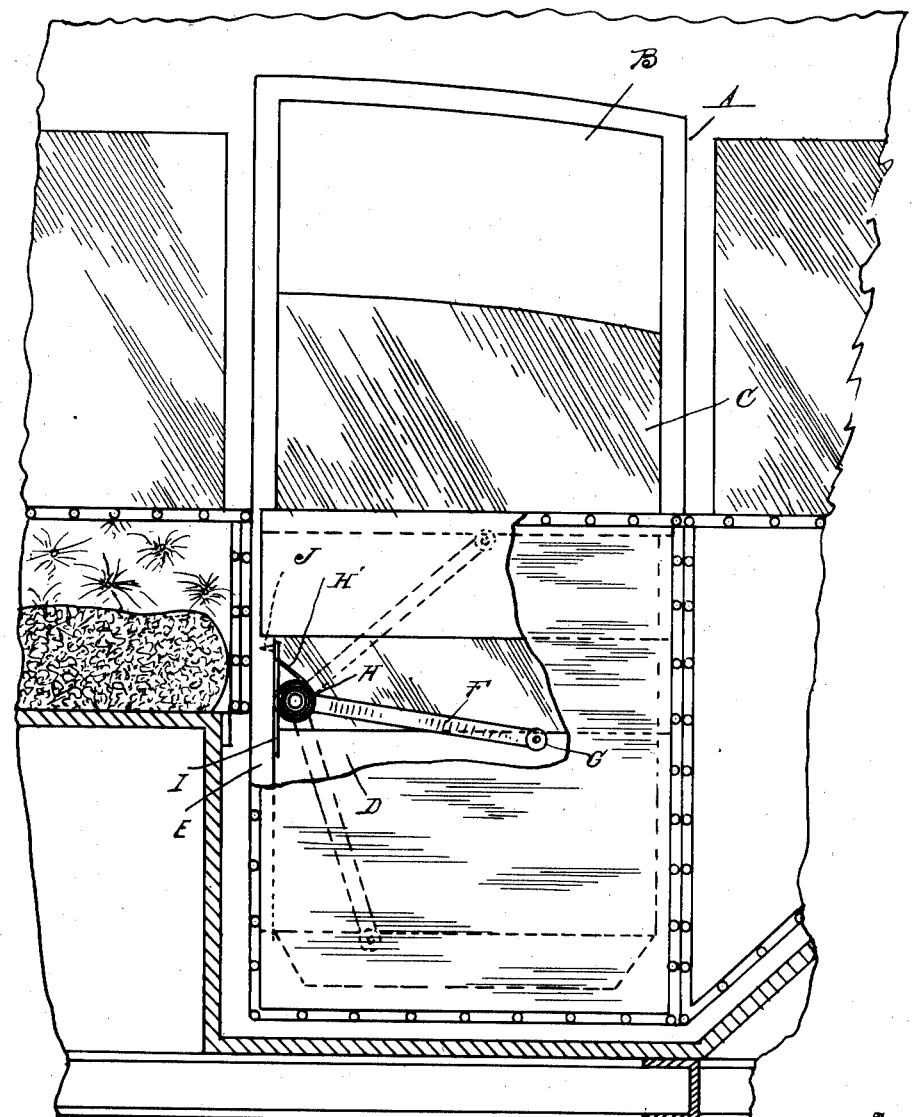
Figure 1 is an interior view of a motor vehicle door provided with the sliding window to which the improved counterbalance means is applied.

In these views, the reference character A designates an automobile door having in its upper portion a window opening B, and provided with a closure for said opening formed by the vertically slidable glass plate C, adapted when lowered to enter a chamber D formed in the lower portion of the door. The lower edge portion of the plate C is engaged by the free end of a pivotal arm F mounted upon one of the side uprights E of the door, said arm preferably carrying a roller G for engagement with said plate. For subjecting the arm F to the desired upwardly acting counterbalancing effort, there is employed a coiled spring H which the invention employs as a pivotal mounting for the arm F. Thus the outer end portion H' of said spring is extended tangentially to the upper portion of a vertically elongated channel iron support I, and is secured to said support by one of the screws J attaching the support to the upright E. The inner extremity of the spring H is bent radially as indicated at $H^2$ to engage in a peripheral notch formed in a plug K inserted centrally within the spring H. Said plug rigidly carries the arm F being secured thereto in any suitable manner, as for example, by the rivets K'. The channel iron support I is so proportioned as to permit the end $H^4$ of the spring to fit between the flanges of said support, the outer coil of the spring H also resting against said support between the flanges thereof. The upwardly acting effort exerted by the spring H upon the arm F is predetermined in value to substantially counterbalance the weight of the window member C. Engagement of the outer coil of the spring H between the flanges of the channel member I prohibits lateral sway of the spring and supported end of the arm bodily, but the convolutions of the spring will permit such slight lateral variation in the position of the arm as may be requisite to adapt said arm to accommodate itself to the window member.

It is to be observed that the arm F has a floating mounting, being free at its pivoted end to undergo a limiting movement in any direction, but more particularly a vertical movement. This mounting secures for the arm a highly desirable flexibility.

The described construction is exceedingly simple to assemble and install and through elimination of a journal bearing, is comparatively inexpensive.

What I claim as my invention is:

1. In a device of the character described, the combination with a counterbalance arm, of a coiled spring secured to and pivotally mounting said arm at its inner end, the outer end of said springs supporting the same and said arm.

2. In a device of the character described, the combination with a counterbalance arm, of a coiled spring, an anchorage member for the inner end of said spring floating centrally of the latter, and means rigidly securing said anchorage member to one end of said arm, the outer end of said spring forming a mounting for the same.

3. In a device of the character described, the combination with a counterbalance arm, of a coil spring exerting a counterbalancing effort upon said arm, and a plug rigidly secured to one end of said arm inserted centrally of said coil and peripherally notched for engagement by the bent inner extremity of the spring, said spring being supported by its outer end portion.

4. In a device of the character described, the combination with a counterbalance arm, of a coil spring engaging said arm at its inner end and having a tangential outer end portion supporting the spring end arm.

5. In a device of the character described, the combination with a counterbalance arm and a coil spring secured at its inner end to said arm and supporting the same, of a support for said spring engaged by the outer end portion of the latter and further engaging an outer coil of the spring to restrain the latter from lateral sway.

6. In a device of the character described, the combination with a counterbalance arm and a coil spring terminally supporting said arm, of a channel member supporting the spring and engaging a convolution thereof to restrain the spring against bodily lateral sway.

In testimony whereof I affix my signature.

STANLEY W. NICHOLSON.